(12) United States Patent
Scheffer (10) Patent No.: US 9,147,400 B2
(45) Date of Patent: *Sep. 29, 2015

(54) METHOD AND APPARATUS FOR GENERATING SPEAKER-SPECIFIC SPOKEN PASSWORDS

(75) Inventor: Nicolas Scheffer, San Francisco, CA (US)

(73) Assignee: SRI INTERNATIONAL, Menlo Park, CA (US)

(*) Notice: Subject to any disclaimer, the term of this patent is extended or adjusted under 35 U.S.C. 154(b) by 512 days.

This patent is subject to a terminal disclaimer.

(21) Appl. No.: 13/333,020

(22) Filed: Dec. 21, 2011

(65) Prior Publication Data

US 2013/0166296 A1   Jun. 27, 2013

(51) Int. Cl.
| | |
|---|---|
| *G10L 15/00* | (2013.01) |
| *G10L 17/02* | (2013.01) |
| *H04L 9/08* | (2006.01) |
| *G06F 21/32* | (2013.01) |
| *G10L 17/04* | (2013.01) |
| *G10L 17/24* | (2013.01) |

(52) U.S. Cl.
CPC ............ *G10L 17/02* (2013.01); *G06F 21/32* (2013.01); *H04L 9/0863* (2013.01); *G10L 17/04* (2013.01); *G10L 17/24* (2013.01)

(58) Field of Classification Search
USPC .................... 704/243, 246, 247, 251, 252
See application file for complete search history.

(56) References Cited

U.S. PATENT DOCUMENTS

| | | | |
|---|---|---|---|
| 6,272,463 B1 * | 8/2001 | Lapere | 704/248 |
| 7,231,019 B2 * | 6/2007 | Pascovici | 379/88.02 |
| 7,386,448 B1 * | 6/2008 | Poss et al. | 704/247 |
| 7,546,630 B2 * | 6/2009 | Tabi | 726/2 |
| 8,190,437 B2 * | 5/2012 | Farrell et al. | 704/273 |
| 8,499,342 B1 * | 7/2013 | Macwan | 726/7 |
| 8,630,860 B1 * | 1/2014 | Zhang et al. | 704/275 |
| 2004/0186724 A1 * | 9/2004 | Morin | 704/273 |
| 2004/0236573 A1 * | 11/2004 | Sapeluk | 704/224 |
| 2006/0111904 A1 * | 5/2006 | Wasserblat et al. | 704/246 |
| 2007/0055516 A1 * | 3/2007 | Kakino et al. | 704/243 |
| 2008/0195389 A1 * | 8/2008 | Zhang et al. | 704/246 |
| 2010/0017209 A1 * | 1/2010 | Yu et al. | 704/246 |
| 2013/0238334 A1 * | 9/2013 | Ma et al. | 704/244 |

\* cited by examiner

*Primary Examiner* — Leonard Saint Cyr
(74) *Attorney, Agent, or Firm* — Barnes & Thornburg LLP; Thomas J. McWilliams; Edward F. Behm, Jr.

(57) ABSTRACT

The present invention relates to a method and apparatus for generating speaker-specific spoken passwords. One embodiment of a method for generating a spoken password for use by a speaker of interest includes identifying one or more speech features that best distinguish the speaker of interest from a plurality of impostor speakers and incorporating the speech features in the spoken password.

20 Claims, 5 Drawing Sheets

METHOD AND APPARATUS FOR GENERATING SPEAKER-SPECIFIC SPOKEN PASSWORDS

FIELD OF THE INVENTION

The present invention relates generally to speech processing, and relates more particularly to speaker identification.

BACKGROUND OF THE DISCLOSURE

Many modern applications use spoken passwords to ensure that access is granted to legitimate users. Typically, these passwords are relatively static (e.g., do not change frequently) and are pre-learned with the speaker. If the password is obtained by someone other than the legitimate user, however, the security of the application can be compromised.

SUMMARY OF THE INVENTION

The present invention relates to a method and apparatus for generating speaker-specific spoken passwords. One embodiment of a method for generating a spoken password for use by a speaker of interest includes identifying one or more speech features that best distinguish the speaker of interest from a plurality of impostor speakers and incorporating the speech features in the spoken password.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for generating speaker-specific spoken passwords. Embodiments of the present invention identify a speaker-specific set of features that are useful for identifying a particular speaker. The speaker-specific set of features includes features (e.g., specific phonemes or prosodic behaviors) that best distinguish the particular speaker from other (e.g., impostor) speakers. The speaker-specific set of features may be implemented in a variety of applications where speaker detection or recognition is useful. For instance, the speaker-specific set of features may be used to generate customized spoken passwords for a given speaker.

Figure 1:
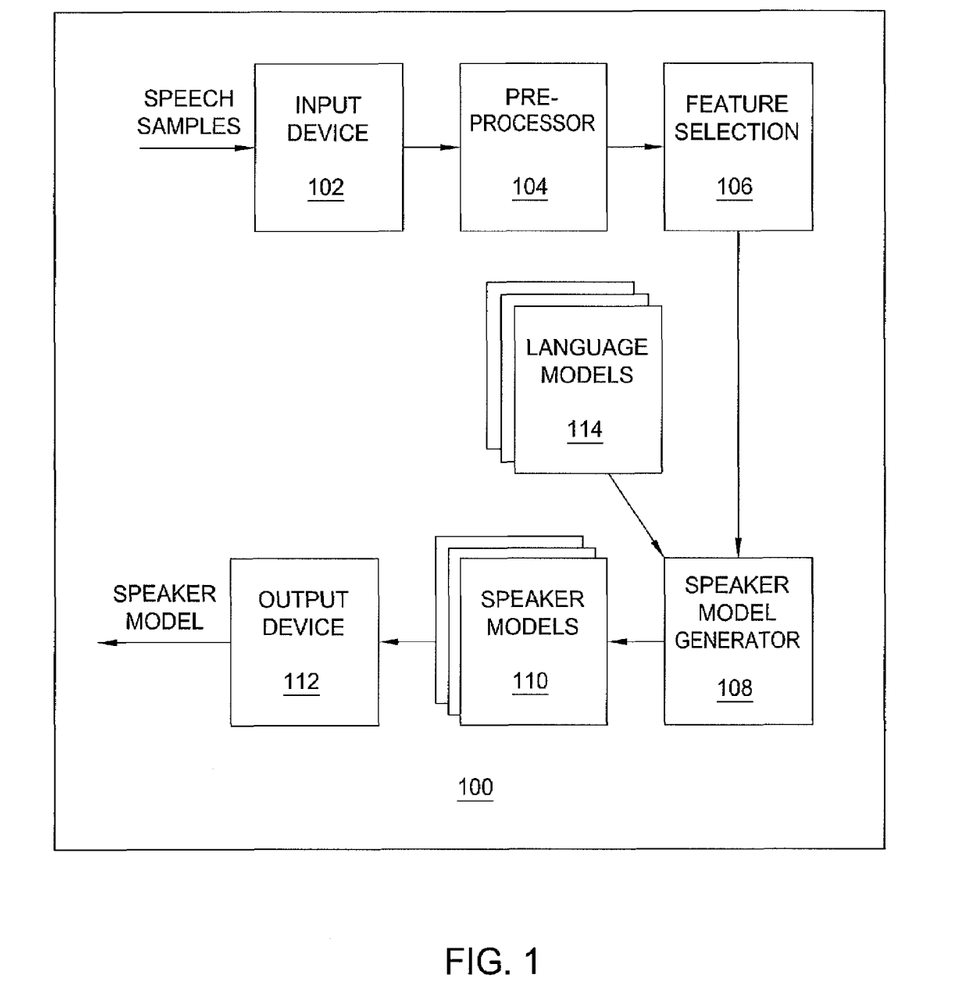
FIG. 1 is a schematic diagram illustrating one embodiment of a system for building a speaker model, according to the present invention.

FIG. 1 is a schematic diagram illustrating one embodiment of a system 100 for building a speaker model, according to the present invention. The system 100 may be a subsystem of a speaker detection system or may be a stand-alone system. In particular, the system 100 is configured to receive a set of training data (i.e., speech samples) from a plurality of speakers (i.e., a speaker of interest plus a plurality of "impostor" speakers) and process the training data in order to produce a speaker model that is specific to the speaker of interest. The speaker model may then be used to detect the speaker of interest in input speech samples.

As illustrated, the system 100 comprises an input device 102, a preprocessor 104, a feature selection processor 106, a speaker model generator 108, a speaker model repository 110, and an output device 112. In alternative embodiments, one or more of these components may be optional. In further embodiments still, two or more of these components may be implemented as a single component.

The input device 102 receives input speech samples. These input speech samples include utterances of a speaker of interest, as well as utterances of a plurality of "impostor" speakers (i.e., individuals who are not the speaker of interest). Thus, the input device 102 may include one or more of: a keyboard, a stylus, a mouse, a microphone, a camera, or a network interface (which allows the system 100 to receive input from remote devices).

The input device is coupled to the preprocessor 104, which receives the input speech samples from the input device 102. The preprocessor 104 performs one or more preprocessing techniques on the input speech samples, such as noise reduction, endpointing, or the like. In an alternative embodiment, preprocessing may be performed on the input speech samples before they are provided to the input device 102; in this case, the preprocessor 104 is not necessary.

The preprocessor 104 is coupled to the feature selection processor 106, which receives the preprocessed input speech samples from the preprocessor 104. The feature selection processor 106 examines the input speech samples and extracts features from the input speech samples for the purposes of creating a speaker-specific speaker model for the speaker of interest. In particular, the feature selection processor 106 identifies the features that best distinguish the speaker of interest from the impostor speakers.

The feature selection processor 106 is coupled to the speaker model generator 108, which receives the extracted features from the feature selection processor 106. The speaker model generator 108 generates a speaker model for the speaker of interest, based on the features that were extracted by the feature selection processor 106. For example, the speaker model generator 108 may assign different weights to different extracted features.

The speaker model repository 110 is coupled to the speaker model generator 108 and stores the speaker models that have been generated by the speaker model generator 108. Thus, the speaker model repository 110 may contain a plurality of speaker-specific speaker models for various speakers of interest.

The output device 112 is coupled to the speaker model repository 110 and can retrieve individual speaker models from the speaker model repository. In particular, the output device 112 can retrieve a speaker model for a given speaker of interest and output the speaker model to a user or to another device or system (such as a speaker detection system). In one embodiment, the output device 112 comprises one or more of the following: a display, a speaker, a haptic device, or a network interface (which allows the system 100 to send outputs to a remote device).

As discussed in further detail below, the system 100 may be adapted to enhance applications beyond speaker detection.

For instance, the system 100 may be adapted to generate speaker-specific spoken passwords for access and authentication applications. In this embodiment, the system 100 additionally includes a set of language models 114. The language models are coupled to the speaker model generator 108 and may be used by the speaker model generator 108 to generate the spoken passwords. In one embodiment, the set of language models 114 includes not only language models, but also dictionaries, lexicons, and the like.

Figure 2:
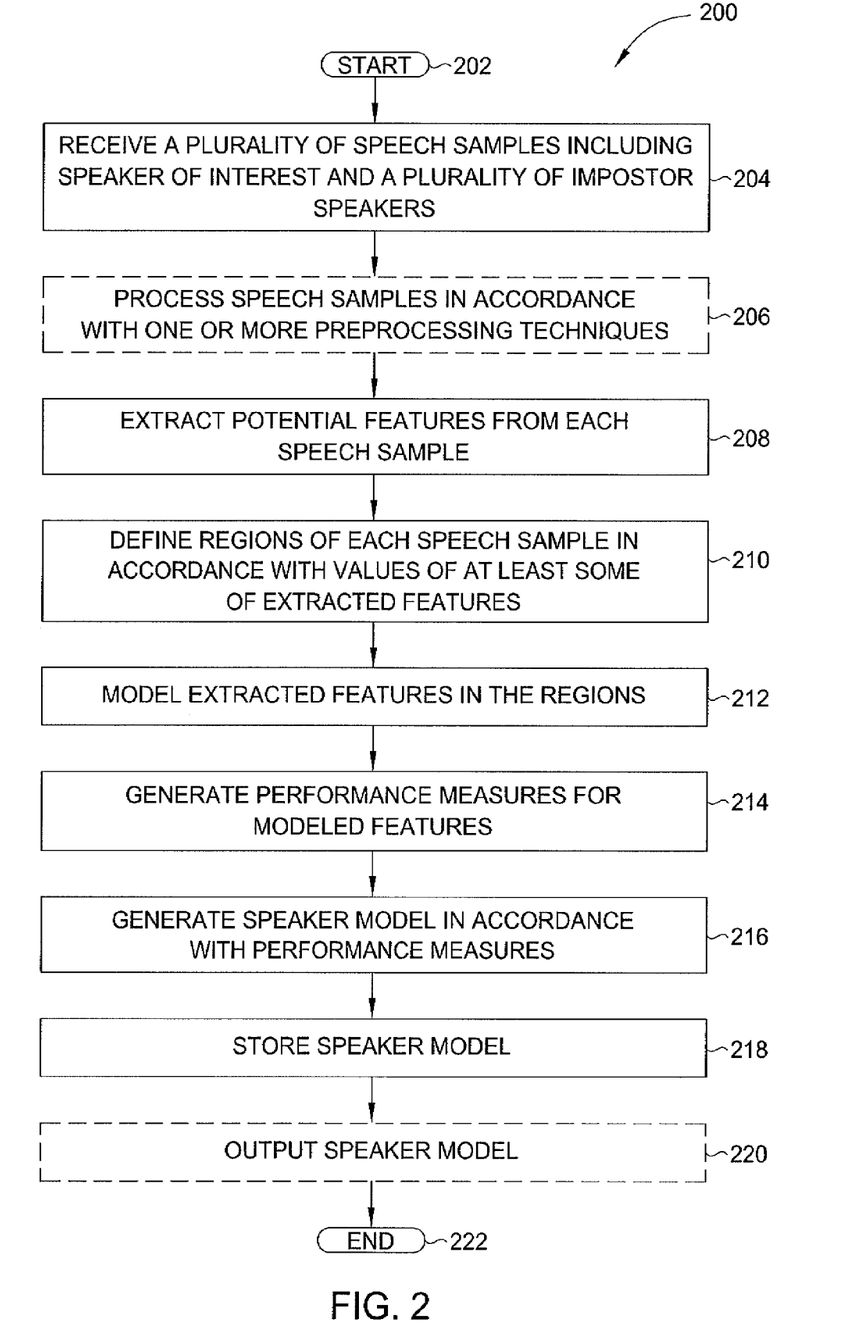
FIG. 2 is a flow diagram illustrating one embodiment of a method for building a speaker model, according to the present invention.

FIG. 2 is a flow diagram illustrating one embodiment of a method 200 for building a speaker model, according to the present invention. The method 200 may be implemented, for example, by the system 100 illustrated in FIG. 1. As such, reference is made in the discussion of FIG. 2 to various elements of FIG. 1. It will be appreciated, however, that the method 200 is not limited to execution within a system configured exactly as illustrated in FIG. 1 and, may, in fact, execute within systems having alternative configurations.

The method 200 is initialized at step 202 and proceeds to step 204, where the input device 102 receives a plurality of speech samples. As discussed above, the plurality of speech samples includes utterances of a speaker of interest, as well as utterances of a plurality of "impostor" speakers (i.e., individuals who are not the speaker of interest).

In optional step 206 (illustrated in phantom), the preprocessor 104 processes the plurality of speech samples in accordance with one or more preprocessing techniques. These preprocessing techniques may include, for example, noise reduction, endpointing, or other preprocessing techniques. Alternatively, as discussed above, the speech samples may be preprocessed before they are received by the input device 102.

In step 208, the feature selection processor 106 extracts potential features from each of the speech samples. In one embodiment, the potential features include frame-level acoustic features, such as pitch and energy. In one embodiment, automatic speech recognition is performed on each speech sample after these frame-level acoustic features are extracted.

In step 210, the feature selection processor 106 defines regions of each speech sample in accordance with the values of at least some of the features extracted in step 208. In one embodiment, the feature values define the boundaries of the regions (e.g., a region in which the values of the pitch are greater than x).

In step 212, the feature selection processor 106 models different features in each of the regions defined in step 208. In one embodiment, the modeled features include one or more of: a cepstral feature constrained by a lexical, phonetic, state-level, prosodic, pause, turn, or speaking-rate feature; a prosodic feature; or a signal processing based feature. Lexical and phonetic features may be based on transcriptions of audible speech samples (e.g., human transcriptions or language-specific or language-independent automatic transcriptions). In one embodiment, the features are modeled using Gaussian mixture models (GMMs) or hidden Markov models (HMMs).

In step 214, the feature selection processor 106 generates performance measures for the modeled features. In one embodiment, a feature's performance measure represents the strength with which the feature can be used accurately distinguish the speaker of interest from the impostor speakers (e.g., where the performance measure ranges from zero to one). In one embodiment, performance measures are generated for both individual features and for combinations of features. In one embodiment, the features (and combinations of features) are ranked according to their performance measures.

In step 216, the speaker model generator 108 generates a speaker model in accordance with the performance measures. In one embodiment, generating a speaker model includes assigning weights to the modeled features (e.g., where a weight of zero effectively excludes a feature from the speaker model). The weights are based on the performance measures assigned in step 214. These features may be assigned by a classifier (e.g., a support vector machine classifier), which is also capable of identifying which features provide the best performance in combination.

In one embodiment, the speaker model generator 108 assigns weights to the modeled features using one or more feature selection algorithms. In one embodiment, these feature selection algorithms include wrapper algorithms that test the performance of a speaker detection system for a subset of features at a time. The wrapper algorithms are iterative. In one embodiment, the algorithms start with a set of all features and discard one feature (e.g., assign a zero weight to the feature) at a time. In an alternative embodiment, the algorithms start with a set of no features (e.g., all weights set to zero) and add one feature at a time. In either case, the algorithms select the optimal feature to discard or add at each iteration, based on the final performance of the speaker detection system for the currently selected set of features.

In one embodiment, when an individual speaker detection system is trained for each modeled feature, the resulting individual score is combined at the score level using standard combination methods trained in a target-dependent manner. In such cases, feature selection can also be achieved using as combiners machine learning procedures that inherently perform feature selection. For instance, any procedure that contains an L1 regularization term on the weights of the individual features will tend to push to zero the weights of the features that are unnecessary. All features that were assigned a zero weight can thus be discarded, considering all other features as selected.

In one embodiment, where data for the speaker of interest may be sparse, a leave-one-out method may be used to perform feature selection and to train calibration transforms and combination parameters. What is left out are samples involving a certain session from the speaker of interest, which are used for testing the model generated with the remaining samples from the speaker of interest. This allows fair assessment of performance while discarding minimal training data.

In step 218, the speaker model is stored in the speaker model repository 110. Additionally, the speaker model may be outputted (e.g., to a user or to a speaker detection system) in optional step 220 (illustrated in phantom).

The method 200 then terminates in step 222.

Thus, the method 200 adapts a speaker model to a specific speaker of interest by identifying the speech features that best distinguish the speaker of interest from other speakers. These best features will vary from speaker to speaker, and thus, the speaker model for one speaker of interest may be based on features that are different from the features on which the speaker model for another speaker of interest is based.

It is to be appreciated that FIG. 2 illustrates only one possible method for building a speaker model. As noted above, certain steps of the method 200 may be considered optional. For example, in an alternative embodiment of the invention, steps 210-212 are optional. In this case, modeling of potential features may be performed for the speech samples in their entireties rather than simply for defined regions of the speech samples.

In one embodiment, the features on which the speaker model is based include a first set of features and a second set of features. The first set of features includes one or more standard features that will be universal to all speakers. These standard features may include, for example, cepstral and prosodic features. These standard features are then used to localize other speech features, such as particular phones. For example, the localized features may include particular phones occurring in close proximity to pauses in speech.

The second set of features includes one or more features that are extracted specifically for the purposes of detecting the speaker of interest. That is, the second set of features includes features that best distinguish the speaker of interest from the impostor speakers. In an alternative embodiment, rather than use a second set of features, the standard features are instead combined in a speaker-specific manner. Thus, the speaker detection system can be calibrated to a particular speaker even if no speaker-specific features are extracted for the particular speaker.

The present invention can be used to improve applications that require extremely accurate speaker recognition, such as applications used by security and intelligence agencies. In particular, the present invention can be used to detect high-profile individuals of interest based on speech samples. Additionally, because the proposed system improves speaker recognition performance, the present invention could improve commercial speaker identification applications, given sufficient training data.

Further uses of the present invention include distinguishing languages or dialects rather than speakers. In this case, each language or dialect is treated as a "speaker," and features are learned to distinguish a given language or dialect from other languages and dialects. For instance, two dialects of a given language may be best distinguished based on their features for specific phones or via specific prosodic patterns.

Further applications of the present invention include using the present invention to calibrate speaker detection systems. For instance, the techniques described above could be used to generate speaker-specific modeling parameters (such as the size of a GMM, the type of model, the impostor speaker data used in training, and the like).

Still further applications of the present invention include using the present invention to generate personally tailored audio passwords for authentication purposes. For example, a speaker specific audio password or phrase can be generated for applications that require a user to be authenticated before access is granted.

Figure 3:
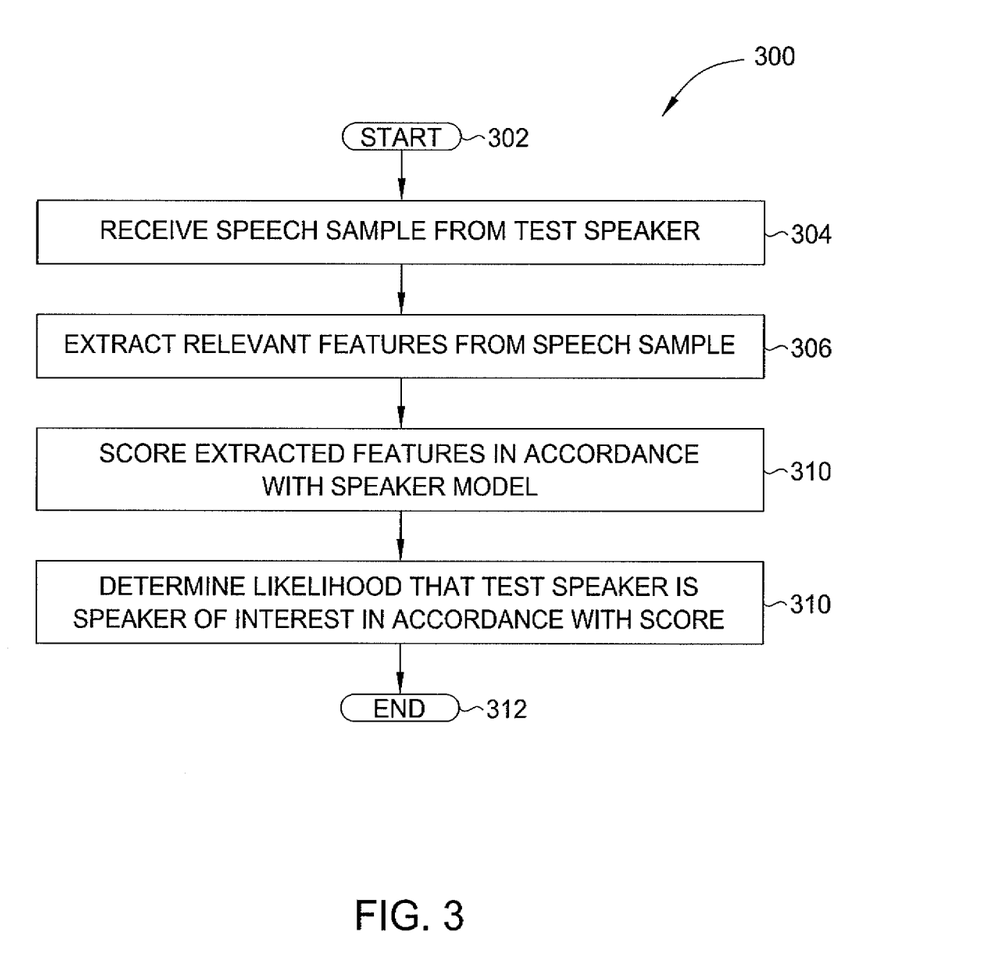
FIG. 3 is a flow diagram illustrating one embodiment of a method for detecting a speaker of interest, according to the present invention.

FIG. 3 is a flow diagram illustrating one embodiment of a method 300 for detecting a speaker of interest, according to the present invention. In particular, the method 300 may be implemented in a speaker detection or speaker recognition system that has access to speaker models such as those produced by the system 100, discussed above. Specifically, the method 300 is used by the speaker detection system to determine whether a test speaker is a speaker of interest (for whom a speaker model has been generated, e.g., in accordance with the method 200).

The method 300 is initialized in step 302 and proceeds to step 304, where a speech sample is received from the test speaker. In step 306, relevant features are extracted from the speech sample. In particular, the speaker detection system determines which features form the basis for the speaker of interest's speaker model. These same features are then extracted from the speech sample for the test speaker.

In step 308, the features that were extracted from the test speaker's speech sample are scored in accordance with the speaker model for the speaker of interest. In particular, the extracted features are assigned the corresponding weights from the speaker model in order to generate a score for the extracted features.

In step 310, the speaker detection system determines the likelihood that the test speaker is the speaker of interest, based on the score generated in step 308. In one embodiment, the likelihood comprises a binary (e.g., yes or no) answer based on some threshold (e.g., if the score is greater than x, the test speaker is likely to be the target speaker). In another embodiment, the score comprises a numeric indicator (e.g., between zero and one) that expresses a confidence that the test speaker is the speaker of interest (e.g., the test speaker is the target speaker with a confidence of 0.x). In yet another embodiment, the likelihood comprises a numeric indicator that relates the likelihoods that the test speaker is the speaker of interest or an impostor speaker (e.g., the test speaker is x times more likely to be the speaker of interest than he is to be an impostor speaker).

The method 300 terminates in step 312.

As discussed above, the system 100 may also be used in conjunction with other applications that involve or can be enhanced by speaker recognition techniques. One of these applications is the generation of speaker-specific spoken passwords. Conventional applications that rely on spoken passwords for access or authentication purposes use pre-learned passwords. These applications become vulnerable if an impostor learns a legitimate user's password. However, by tailoring the password such that it leverages the speech features that best distinguish the legitimate user, the application can be made more secure.

Figure 4:
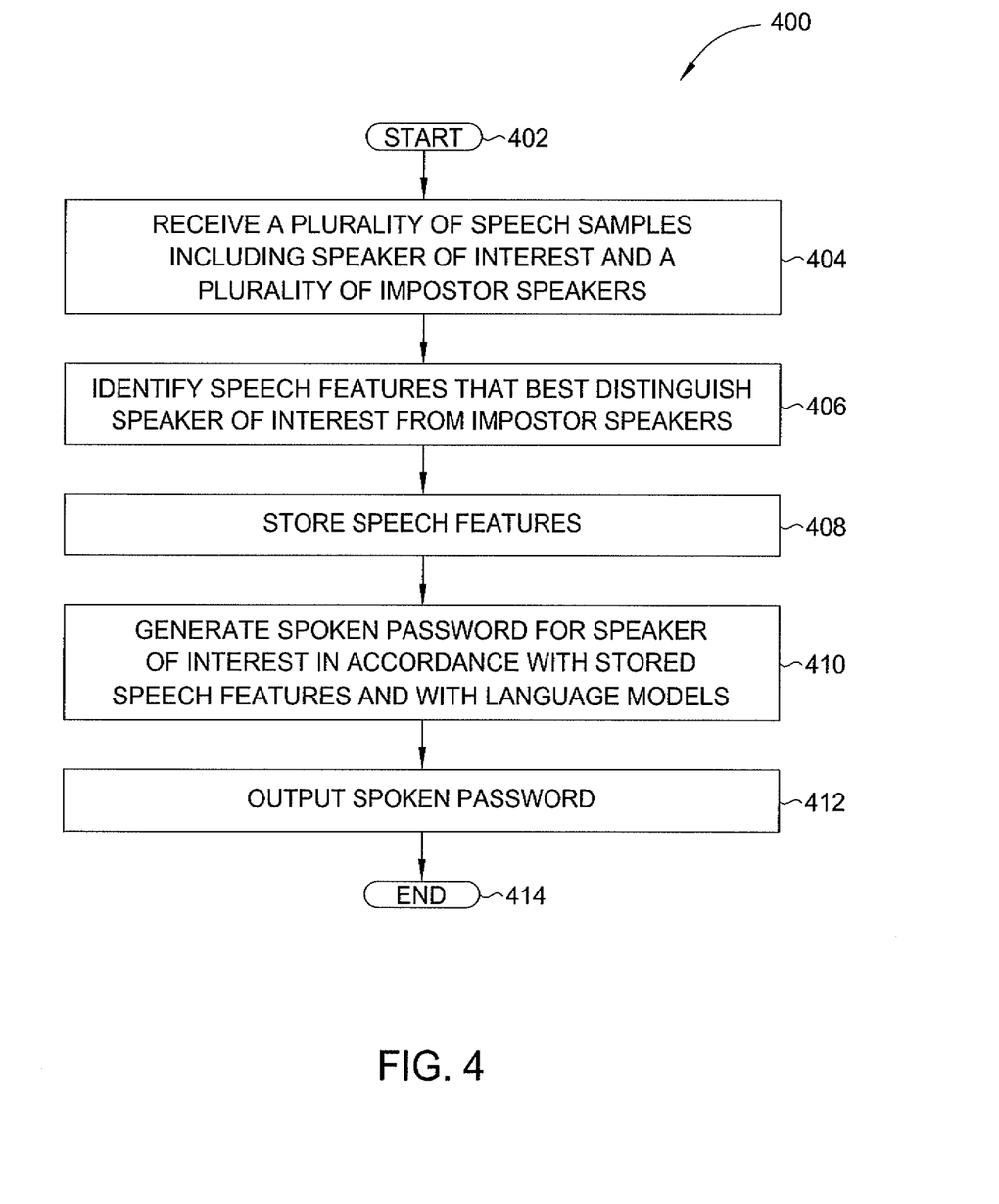
FIG. 4 is a flow diagram illustrating one embodiment of a method for generating a speaker-specific spoken password, according to the present invention.

FIG. 4 is a flow diagram illustrating one embodiment of a method 400 for generating a speaker-specific spoken password, according to the present invention. In particular, the method 400 generates a customized spoken password for a speaker of interest. The method 400 may be implemented, for example, by the system 100 illustrated in FIG. 1. As such, reference is made in the discussion of FIG. 4 to various elements of FIG. 1. It will be appreciated, however, that the method 400 is not limited to execution within a system configured exactly as illustrated in FIG. 1 and, may, in fact, execute within systems having alternative configurations.

The method 400 is initialized in step 402. In step 404, the input device 102 receives a plurality of speech samples including the speaker of interest and one or more impostor speakers. In one embodiment, the speech sample associated with the speaker of interest is at least ten seconds long.

In step 406, the feature selection processor 106 identifies, in accordance with the speech samples, the speech features that best distinguish the speaker of interest from the impostor speakers. In one embodiment, this determination is made in the manner discussed above with respect to FIG. 2. That is, the performance of various speech features and combinations of speech features are measured and ranked based on their ability to successfully detect the speaker of interest. In one embodiment, the features include one or more of: a phone, a state-phone, a context-dependent phone, a tri-phone, or another ASR unit. In step 408, these features are then stored with a speaker model for the speaker of interest (e.g., in the speaker model repository 110). In one embodiment, the features are stored along with labels associated with the features.

In step 410, the speaker model generator 108 generates a spoken password for the speaker of interest, in accordance with the stored speech features and with the language models 114. In particular, the speaker model generator 108 parses the language models 114 for one or more words that would elicit utterance of one or more of the stored features when spoken. In one embodiment, the labels associated with the features are used as an index into the language models 114.

In step 412, the output device 112 outputs the spoken password. The method 400 then terminates in step 414.

In one embodiment, the speaker-specific password generated in step 400 is dynamic. That is, a new password is generated each time a password is required. The method 400 is text-independent, and the accuracy of the speaker-specific password can be increased with the amount of the speech samples available for the speaker of interest. Authentication of a user using the speaker-specific password is performed in a manner similar to the method 300.

Figure 5:
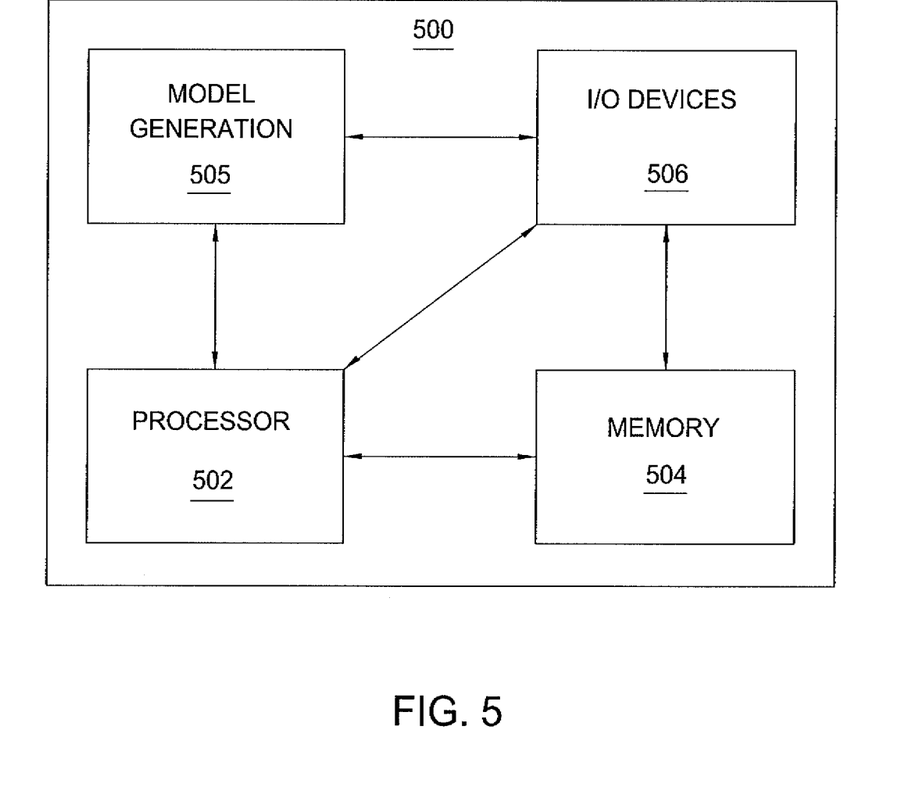
FIG. 5 is a high level block diagram of the present invention implemented using a general purpose computing device.

FIG. 5 is a high level block diagram of the present invention implemented using a general purpose computing device 500. It should be understood that embodiments of the invention can be implemented as a physical device or subsystem that is coupled to a processor through a communication channel. Therefore, in one embodiment, a general purpose computing device 500 comprises a processor 502, a memory 504, a model generation module 505, and various input/output (I/O) devices 506 such as a display, a keyboard, a mouse, a modem, a microphone, speakers, a touch screen, and the like. In one embodiment, at least one I/O device is a storage device (e.g., a disk drive, an optical disk drive, a floppy disk drive).

Alternatively, embodiments of the present invention (e.g., model generation module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the model generation module 505 for generating a speaker model for speaker-specific detection described herein with reference to the preceding Figures can be stored on a non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for generating a spoken password for use by an individual speaker of interest, the method comprising:
generating a speaker-specific model from a plurality of speech samples, the speaker-specific model identifying one or more speaker-distinguishing speech features that distinguish the individual speaker of interest as different from a plurality of impostor speakers, the speaker-specific model generated by:
extracting a plurality of features from utterances of the speaker of interest and from utterances of other speakers;
defining one or more regions within the utterances based on the extracted features;
modeling one or more speech features within each of the one or more regions; and
based on the modeling, assigning a performance measure to one or more of the extracted features, wherein the performance measure represents a strength with which the one or more extracted features distinguishes the speaker of interest from the other speakers; and
using the speaker-specific model to generate a spoken password that would elicit the speaker-distinguishing feature when the spoken passphrase is spoken.

2. The method of claim 1, comprising:
obtaining a plurality of speech samples, the plurality of speech samples comprising a first speech sample from the speaker of interest and a plurality of additional speech samples from a plurality of impostor speakers;
extracting a plurality of speech features from each of the plurality of speech samples; and
ranking the plurality of speech features according to an ability to distinguish the speaker of interest from the plurality impostor speakers.

3. The method of claim 2, wherein the extracting comprises:
extracting one or more frame-level acoustic features from each of the plurality of speech samples;
performing speech recognition processing on the one or more frame-level acoustic features, wherein the speech recognition processing assigns a value to each of the one or more frame-level acoustic features; and
defining one or more regions within each of the plurality of speech samples, in accordance with the value assigned to each of the one or more frame-level acoustic features.

4. The method of claim 3, wherein the one or more frame-level acoustic features include at least one of pitch or energy.

5. The method of claim 3, wherein the ranking comprises:
modeling one or more speech features within each of the one or more regions; and
assigning a performance measure to each of the one or more speech features subsequent to the modeling, wherein the performance measure for an associated one of the one or more speech features represents a strength with which the associated one of the one or more speech features accurately distinguishes the speaker of interest from the plurality of impostor speakers.

6. The method of claim 5, wherein at least one of the one or more speech features comprises a combination of two or more individual speech features.

7. The method of claim 5, wherein the selecting comprises: assigning a weight to each of the one or more speech features, based on the performance measure associated with the each of the one or more speech features.

8. The method of claim 7, wherein a weight of zero excludes an associated one of the one or more speech features from the spoken password.

9. The method of claim 7, wherein the assigning is performed by a classifier.

10. The method of claim 7, wherein the selecting further comprises: storing the performance measure associated with each of the one or more features.

11. The method of claim 10, wherein the performance measure associated with each of the one or more features is stored with a speaker model for the speaker of interest.

12. The method of claim 7, wherein the selecting further comprises:
generating the spoken password in accordance with the one or more features and at least one language model.

13. The method of claim 12, wherein the at least one language model includes at least one of: a language model, a dictionary, or a lexicon.

14. The method of claim 12, wherein the generating comprises:
  selecting at least one word from the at least one language model in accordance with a label associated with each of the one or more features.

15. The method of claim 1, wherein the one or more speaker-distinguishing speech features includes at least one of: a cepstral feature, a prosodic feature, or a signal processing-based feature.

16. The method of claim 15, wherein the cepstral feature is constrained by one of: a lexical feature, a phonetic feature, a state-level feature, a prosodic feature, a pause feature, a turn feature, or a speaking-rate feature.

17. The method of claim 1, wherein the one or more speaker-distinguishing speech features vary from one speaker of interest to another speaker of interest.

18. The method of claim 1, wherein a new spoken password is generated each time the speaker of interest wishes to access an application.

19. One or more non-transitory computer readable media comprising instructions executable to cause a computing device to generate a spoken password for use by an individual speaker of interest, the instructions comprising:
  generating a speaker-specific model from a plurality of speech samples, the speaker-specific model identifying one or more speaker-distinguishing speech features that distinguish the individual speaker of interest as different from a plurality of impostor speakers, the speaker-specific model generated by:
  extracting a plurality of features from utterances of the speaker of interest and from utterances of other speakers;
  defining one or more regions within the utterances based on the extracted features;
  modeling one or more speech features within each of the one or more regions; and
  based on the modeling, assigning a performance measure to one or more of the extracted features, wherein the performance measure represents a strength with which the one or more extracted features distinguishes the speaker of interest from the other speakers; and
  using the speaker-specific model to generate a spoken password that would elicit the speaker-distinguishing feature when the spoken passphrase is spoken.

20. A system for generating a spoken password for use by an individual speaker of interest, the system comprising one or more computing devices configured to:
  generate a speaker-specific model from a plurality of speech samples, the speaker-specific model configured to identify one or more speaker-distinguishing speech features that distinguish the individual speaker of interest as different from a plurality of impostor speakers, the speaker-specific model generated by:
  extracting a plurality of features from utterances of the speaker of interest and from utterances of other speakers;
  defining one or more regions within the utterances based on the extracted features;
  modeling one or more speech features within each of the one or more regions; and
  based on the modeling, assigning a performance measure to one or more of the extracted features, wherein the performance measure represents a strength with which the one or more extracted features distinguishes the speaker of interest from the other speakers; and
  use the speaker-specific model to generate a spoken password that would elicit the speaker-distinguishing feature when the spoken passphrase is spoken.

* * * * *